3,796,628
METHOD FOR REDUCING SULFIDE ODORS FROM KRAFT MILL LIME KILN STACKS
Biswanath Sen, Quesnel, British Columbia, Canada, assignor to Cariboo Pulp and Paper Company, Quesnel, British Columbia, Canada
No Drawing. Filed Sept. 12, 1972, Ser. No. 288,465
Int. Cl. D21c 11/08
U.S. Cl. 162—51                                11 Claims

ABSTRACT OF THE DISCLOSURE

A process for the reduction of malodors emitted from Kraft mill lime kiln stacks in the manufacture of pulp by the "Kraft" or sulphate cellulose process. The cooking of wood chips with white liquor is followed by the steps of separating the black liquor from the pulp, evaporating excess water from the liquor, burning the evaporated liquor to form green liquor and then treating the green liquor with lime to form white liquor and a lime mud slurry. The white liquor is recycled for the cooking of further chips, and the lime mud slurry is calcined in a kiln to produce lime and carbon dioxide. The slurry is intimately mixed with an oxidizing agent to reduce the sulfide content of the slurry before the slurry is burned in the lime kiln. The oxidizing agent may be a gas such as air, chlorine or chlorine dioxide. The gaseous oxidizing agent may suitably be intimately mixed with the slurry by the use of an oxidation tube or any suitable contact apparatus.

---

This invention relates to the treatment of a lime mud slurry obtained in the manufacture of pulp by the sulphate cellulose process so as to reduce the malodors emitted from Kraft mill lime kiln stacks.

Air pollution has become a very serious problem throughout the world. One of the contributors to this contamination has been cellulose pulp mills which normally emit large quantities of malodorous gases from their lime kiln stacks. It is the object of this invention to reduce these malodors to a minimal level.

Kraft pulp mills emit a characteristic odor of gaseous sulfur compounds in cooking, evaporation and recovery plants. The odor is due to the formation of hydrogen sulfide, mercaptans and other organic compounds formed in these processes. Modern technology has consistently tried to reduce these emissions by several methods such as weak or strong black liquor oxidation, collection and burning of odorous gases in the lime kiln, and avoiding direct contact of the black liquor with flue gas. These are well known to those skilled in the art.

These methods have reduced the quantity of odorous gas emissions from a Kraft mill, but not eliminated it altogether. The main source of odorous sulfur gases remains in the lime kiln stack, even after burning the gases in the lime kiln.

After cooking wood chips with "white liquor," the waste "black liquor" is separated from the pulp, and converted through evaporation and burning into "green liquor," which is then causticized with lime to form "white liquor" back again along with lime mud. A secondary recovery cycle of generating lime back from lime mud is achieved by calcining the lime mud in a kiln. The reaction which takes place in the lime kiln is as follows:

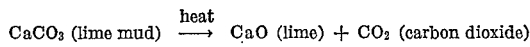

When odorous gases collected from different sources are burnt in the lime kiln, they are completely burnt to sulfur dioxide and sulfur trioxide at the high temperature of the kiln, 1800 to 2000° F. However, the moist lime mud fed to the cool part of the kiln contains some sodium sulfide, which reacts with carbon dioxide and sulfur dioxide in the flue gas in the following manner to release hydrogen sulfide, a malodorous gas.

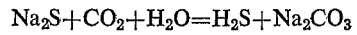

The malodorous gases from the lime kiln stack is therefore composed largely of hydrogen sulfide, and the quantity relates almost directly to the sodium sulfide content of the lime mud. In accordance with the present invention, it is proposed to oxidize the lime slurry by oxygen or other oxidizing chemicals preferably before it is filtered and the solid lime mud is fed into the lime kiln, so that the sulfide in the lime mud is destroyed and there is no chance of forming hydrogen sulfide in the cool end of the lime kiln. This will produce a much lower level of odor in a Kraft mill than has been hitherto possible.

Prior workers in this field have disclosed the treatment of black liquor containing sulfide and mercaptans by means of treatment with air, for the removal by oxidation of such offensive and malodorous sulfur compounds, for example Canadian Pat. No. 810,108, issued Apr. 8, 1969 to Adelberto Tirado. Other disclosures deal with the oxidation and/or chlorination of objectionable sulfur compounds in spent liquor from the digestion of sulfite or sulfate pulp, such as Canadian Pat. No. 828,653, issued Dec. 2, 1969—Nils V. Manbro.

The novel method according to the present invention provides for the economical application of the oxidation step to the lime mud slurry. The white liquor may be oxidized by known means such as the process outlined in Canadian Pat. 529,238, issued Aug. 21, 1956 to Hilding Bergstrom. This may be effective in converting the sulphur to non-malodorous gases as in the present oxidation of the lime mud slurry, but is more expensive than the present invention because of the higher loss of chemicals.

The present invention therefore provides a process for reducing malodors emitted from Kraft mill lime kiln stacks in the burning of a lime mud slurry obtained in the manufacturing of paper pulp by the sulfate cellulose process, comprising lowering the sulfide content of the slurry by oxidizing the slurry with an oxidizing agent.

In a preferred form, the oxidation is carried out by intimately mixing the slurry with a gaseous oxidizing agent.

Among preferred gaseous oxidizing agents may be included oxygen, chlorine and chlorine dioxide. Air may be employed as a source of oxygen, and may also function as a carrier for some of the other oxidizing agents. The chlorine or chlorine dioxide oxidizing agents may desirably be obtained as a waste gas from some other step in the paper making process, such as from the bleach making or pulp bleaching exhaust gases.

The oxidizing agent may be a liquid or solid material, such as hydrogen peroxide, alkali metal chlorate or alkali metal hypochlorite, generally in aqueous solution.

In accordance with a preferred embodiment the present invention provides, in such a process for secondary recovery of lime from black liquor resulting from cooking of wood chips with white liquor, comprising the steps of separating the black liquor from the pulp, evaporating excess water from the liquor, burning the evaporated liquor into green liquor and then treating the green liquor with lime to form white liquor, along with lime mud slurry, said white liquor being recycled for the cooking of further chips, and said lime mud slurry being calcined in a kiln to produce lime and carbon dioxide, the improvement comprising intimately mixing the slurry with a gaseous oxidizing agent to reduce the sulfide content of the slurry.

In such processes the gaseous oxidizing agent may be mixed with the slurry for intimate contact therewith, by various contacting or diffusion means. For example, the gaseous oxidizing agent may be intimately mixed with the slurry by pumping the slurry through oxidation tube which is concentric with the oxidizing gas supply means. Most efficiently, the oxidation tube may deliver a mixture of slurry and gaseous oxidizing agent to a cyclone separator whereby to maintain the gas and slurry in intimate contact over an extended period of time, and to effectively separate them thereafter.

The gas liquid contact may also be effected by other known contact means, such as towers containing packing or trays.

The oxidizing step will preferably precede the filtering of the slurry.

In another aspect the gaseous oxidizing agent may be supplied under superatmospheric pressure to a reaction zone through which the lime slurry is flowing continuously. A pressure of 2 to 6 atmospheres is preferred. As efficiency of oxidation by air or oxygen will be improved by increasing the gas pressure, this will give more complete conversion of the sulfide in the lime mud slurry and therefore more complete elimination of odor.

If a sample of lime mud is treated with an acid or a stream of carbon dioxide or sulfur dioxide is bubbled through it, then the characteristic putrid small of hydrogen sulfide is evolved which can also be identified by blackening of lead acetate paper held above the slurry. Samples of lime mud slurry oxidized as herein discussed ceased to give the characteristic hydrogen sulfide smell and there was no blackening of lead acetate paper, which shows that the sulfide in the lime slurry was destroyed by oxidation. There are well known chemical procedures and tests available for evaluation of the various factors involved in this art.

Oxidation by nongaseous chemicals may be achieved by addition of the oxidizing agent to the lime mud slurry at the point of its entry into the lime mud storage tank or with the wash water sprays on the lime mud filter. Other points of addition of the oxidizing agent are feasible in accordance with the present invention.

The oxidation reaction may be carried out at any suitable temperature preferably above ambient. A preferred range of temperature appears to lie between 100 to 200° F.

I claim:

1. A process for reducing malodors emitted from Kraft mill lime kiln stacks in the burning of a lime mud slurry obtained in the manufacturing of paper pulp by the sulfate cellulose process comprising lowering the sulfide content of the slurry by oxidizing the slurry with an oxidizing agent before burning the slurry in the lime kiln.

2. A process as in claim 1 wherein the oxidizing agent is chosen from the group consisting of hydrogen peroxide, alkali metal chlorate, and alkali metal hypochlorite.

3. A process as in claim 1 for reducing malodors emitted from Kraft mill lime kiln stacks in the burning of a lime mud slurry obtained in the manufacturing of paper pulp by the sulfate cellulose process comprising oxidatively lowering the sulfide content of the slurry by intimately mixing the slurry with a gaseous oxidizing agent.

4. A process as in claim 3 wherein the oxidizing agent is selected from the group consisting of oxygen, chlorine and chlorine dioxide.

5. A process as in claim 4 wherein oxygen is the oxidizing agent, and it is supplied to the process in the form of air.

6. A process as in claim 3 for reducing malodors emitted from Kraft mill lime kiln stacks in the burning of a lime mud slurry obtained in the manufacturing of paper pulp by the sulfate cellulose process comprising oxidatively lowering the sulfide content of the slurry with a waste gas containing oxidizing agents chosen from the group consisting of chlorine and chlorine dioxide.

7. In a process as in claim 1 for secondary recovery of lime from black liquor resulting from cooking of wood chips with white liquor, comprising the steps of separating the black liquor from the pulp, evaporating excess water from the liquor, burning the evaporated liquor into green liquor and then treating the green liquor with lime to form white liquor, along with lime mud slurry, said white liquor being recycled for the cooking of further chips, and said lime slurry being calcined in a kiln to produce lime and carbon dioxide, the improvement comprising intimately mixing the slurry with a gaseous oxidizing agent to reduce the sulfide content of the slurry.

8. A process as in claim 3 wherein the gaseous oxidizing agent is bubbled through the slurry, or reacted with it in a tower.

9. A process as in claim 3 wherein the gaseous oxidizing agent is intimately mixed with the slurry by pumping the slurry through an oxidation tube which is concentric with a gaseous supply means.

10. A process as in claim 9 wherein the oxidation tube delivers a mixture of slurry and gaseous oxidizing agent to a cyclone separator, whereby to maintain the gas and slurry in intimate contact over an extended period of time, and to effectively separate them thereafter.

11. A process as in claim 3 wherein the gaseous oxidizing agent is supplied under superatmospheric pressure to a reaction zone through which the lime slurry is flowing continuously.

References Cited
UNITED STATES PATENTS 3,183,145   5/1965   Collins, Jr. _____ 162—51

S. LEON BASHORE, Primary Examiner

W. F. SMITH, Assistant Examiner

U.S. Cl. X.R.

162—30; 210—63; 423—178, 638